United States Patent [19]

Hurrell, II et al.

[11] Patent Number: 5,537,032

[45] Date of Patent: Jul. 16, 1996

[54] SHAPE COUPLED WHEEL SPEED SENSOR

[75] Inventors: George L. Hurrell, II, Port Clinton; Richard F. Miller, Castalia; Edward R. Clark, Monroeville, all of Ohio

[73] Assignee: General Motors Corporation, Detroit, Mich.

[21] Appl. No.: 415,899

[22] Filed: Apr. 3, 1995

[51] Int. Cl.⁶ .............................. G01P 3/488; F16C 32/00
[52] U.S. Cl. .................. 324/173; 324/174; 324/207.22; 384/448
[58] Field of Search ........................ 324/173, 174, 324/207.15, 207.16, 207.21, 207.22, 207.25, 207.2; 310/168; 384/448; 188/181 R

[56] References Cited

U.S. PATENT DOCUMENTS

| | | | |
|---|---|---|---|
| 3,559,064 | 1/1971 | Grundy | 324/173 |
| 3,716,121 | 2/1973 | Frigger | 188/181 R |
| 3,942,112 | 3/1976 | Westbrook | 324/166 |
| 4,529,933 | 7/1985 | Bleeke | 324/173 |
| 4,700,133 | 10/1987 | Day | 324/208 |
| 4,778,286 | 10/1988 | Kadokawa | 324/174 X |
| 4,795,278 | 1/1989 | Hayashi | 384/448 |
| 4,864,231 | 9/1989 | Okumura et al. | 324/173 |
| 4,969,753 | 11/1990 | Kato et al. | 384/448 |
| 4,988,220 | 1/1991 | Christiansen et al. | 384/448 |
| 5,004,358 | 4/1991 | Varvello et al. | 384/446 |
| 5,011,302 | 4/1991 | Mott et al. | 384/448 |
| 5,011,303 | 4/1991 | Caron | 384/448 |
| 5,018,384 | 5/1991 | Hayashi et al. | 73/118.1 |
| 5,032,790 | 7/1991 | Jonnson | 324/174 |
| 5,051,693 | 9/1991 | Brauer | 324/207.22 |
| 5,053,656 | 10/1991 | Hodge | 310/42 |
| 5,085,519 | 2/1992 | Dougherty | 384/448 |
| 5,183,341 | 2/1993 | Ouchi et al. | 384/446 |
| 5,264,790 | 11/1993 | Moretti et al. | 324/174 |
| 5,296,805 | 3/1994 | Clark et al. | 324/174 |

FOREIGN PATENT DOCUMENTS

| | | | |
|---|---|---|---|
| 166204 | 10/1983 | Japan | 324/207.22 |
| 276557 | 10/1992 | Japan | 324/207.25 |
| 893986 | 4/1962 | United Kingdom | 324/174 |

*Primary Examiner*—Gerard R. Strecker
*Attorney, Agent, or Firm*—Jeffrey A. Sedlar

[57] ABSTRACT

A wheel speed sensing device with shape-coupled sensor and exciter ring components reduces the effects of tolerance stack variances in the relative radial and axial locations of the sensor and exciter ring. Additionally, the assembly is readily adapted to installation within the sealed confines of the bearing area of a wheel.

3 Claims, 4 Drawing Sheets

SHAPE COUPLED WHEEL SPEED SENSOR

BACKGROUND OF THE INVENTION

The present invention relates to vehicle wheel speed sensing devices and more particularly, to sensing devices of the variable reluctance type having associating rotating exciter ring and fixed sensor components.

Variable reluctance sensors are used in a variety of speed and position sensing applications. Variable reluctance sensors are electro-magnetic devices that produce an output voltage due to a time varying change in flux flowing through the sensor's coil. This provides a means of measuring translational or rotational motion.

Wheel speed sensing devices such as those used in combination with vehicle anti-lock braking systems are known wherein a sensor provides a magnetic field through some type of magnet that is generally combined in proximity with a sensing coil into a single sensor component. The coil-magnet component, (sensor), is generally mounted in a fixed position relative to the vehicle since it includes signal wires for communication with an electronic control means.

Varying flux is caused by a rotating exciter ring that is positioned near the sensor. The exciter ring is generally made of iron and includes a toothed configuration. It is known to mount an exciter ring so as to turn in rotation at the angular speed of the wheel within the sensor's magnetic field to create an electric signal that varies with the speed of the wheel.

It is, in general, known to mount the sensing device such that it is combined with the wheel's bearing assembly, since the bearing assembly provides a fixed race and a rotating race, moving at wheel speed, in close proximity. In this type of a device the exciter ring is conventionally mounted to the rotating race and the sensor component is mounted to the fixed race. Combining a sensing device with the bearing provides an advantage in-that bearings typically have seals enclosing the bearing area including an annular space between the fixed and rotating races, protecting the bearing rolling elements and retaining lubricant. These advantages combine to make it preferential to mount the sensing device in combination with the wheel bearing assembly.

Preferably, the sensor element is installed such that it can be removed for servicing or replacement with minimal disassembly of other vehicle components and without a requirement for special tooling. This is complicated when the sensing device is mounted in association with a wheel bearing.

Additionally, it is essential that a proper air gap for the magnetic flux path route between the sensor and the exciter ring be maintained to provide an acceptable signal. Variations that occur in the wheel bearing, sensor and exciter ring as a result of manufacturing and assembly operations can result in undesirable air gap variations.

Therefore, due to the complication of assembly and tolerance stack of the wheel bearing, assembly obstacles must be overcome to mount a sensing device to take advantage of the protected environment between the wheel bearing seals. When mounting the sensing device in combination with the wheel bearing assembly, these and other obstacles that arise must be overcome to provide an acceptable sensing device and wheel bearing combination.

SUMMARY OF THE INVENTION

The present invention seeks to provide a sensing device that is mountable within the protected environment of a wheel's bearing assembly resulting in an operable air gap of low position sensitivity without a need for individual assembly adjustment.

In accordance with the present invention a sensing device includes an exciter ring with an annular groove extending around the periphery of the exciter ring formed by a notch extending through each of a plurality of teeth projecting radially outward from the exciter ring and includes a sensor with a pole piece extension. The pole piece extension is shape-coupled to pass within the annular groove of the rotatable exciter ring in a spaced-apart, radially engaged manner. Alternatively, the sensor pole piece is notched and the exciter ring includes a shape-coupled extension for passing through the notch in the sensor.

The magnetic flux path of the sensing device extends through gaps between the axial sides of the sensor pole piece and the teeth. The resulting operational characteristics of the sensing device are less sensitive to relative radial location of the sensor and exciter ring components. Function of the sensing device is also less sensitive to relative axial location of the components.

Performance requirements of the sensing device are achieved simply by means of providing the sensor pole piece extension in a location properly mating within the annular groove of the exciter ring so that it passes through each tooth's notch. A weakest but functionally adequate signal occurs when the pole piece extension is axially centered in the notch. Axial position of the pole piece extension toward either side of the notch, off-center, results in a higher sensor output.

Alternative advantages include having the option to exchange the male and female arrangement between the shape-coupled sensor extension and exciter ring tooth notch. The shape of the sensor extension and tooth notch can be varied. Additionally, the shape coupling concept is applicable to multi-pole sensing devices as well as single-pole sensing devices.

BRIEF DESCRIPTION OF THE DRAWINGS

FIG. 1 is a cross sectional view of a vehicle wheel bearing incorporating a preferred embodiment of the present invention.

DETAILED DESCRIPTION OF THE PRESENTLY PREFERRED EMBODIMENT

Figure 2:
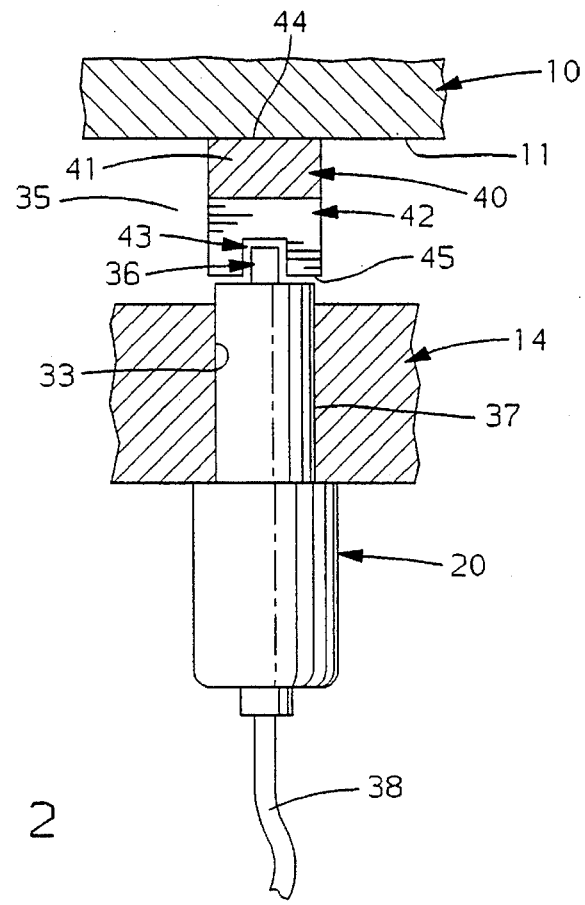
FIG. 2 is a detail illustration of a sensor and exciter ring.

Referring to FIG. 1, illustrated is a vehicle wheel bearing assembly including a rotatable inner race or spindle 10. Spindle 10 is powered by a splined drive shaft 12 or alternatively, is free wheeling and includes a series of studs represented by stud 23 for carrying a disc brake rotor 25 and a wheel (not illustrated). Spindle 10 is maintained on splined drive shaft 12 by washer 31 and threaded nut 30. Spindle 10, whether powered by the splined drive shaft 12 or free wheeling, is the rotating bearing race and therefore, reaches high angular velocities.

Spindle 10 is surrounded by a radially spaced outer race or hub 14 which is relatively stationary and is bolted to a vehicle suspension 16 by a plurality of bolts representative of which is bolt 21. An axially spaced pair of rolling element rows 15 and 18 carried by cages 17 and 19 respectively, operate within the radial space 35 between spindle 10 and hub 14 and run on opposed pathway surfaces of each. A pair of seals 27 and 28 are positioned between spindle 10 and hub 14 to maintain a protected environment in the area of rolling element rows 15, 18 and radial space 35.

Exciter ring 40 is fixed on spindle 10 between rolling element rows 15 and 18, and rotates therewith, at the wheel's angular velocity. A sensor 20 includes a pole piece which extends through opening 33 in hub 14 and into radial space 35. Sensor 20 is removably maintained in opening 33 by a retention means, such as through the engagement of a conventional clip device (not illustrated). Sensor 20 also includes leads 38 for communication with control electronics (not illustrated).

Figure 4:
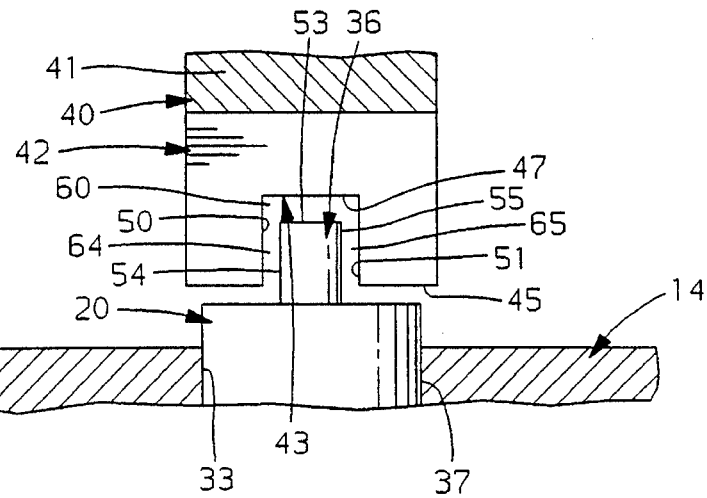
FIG. 4 is a fragmentary detail illustration of the sensor and exciter ring combination shown in FIG. 2.

Referring to FIGS. 2 and 4, more detailed illustrations of the sensor 20 and exciter ring 40 are illustrated. Exciter ring 40 includes an annular base 41 with an inside diameter 44 that engages the outside diameter 11 of spindle 10. Extending radially from annular base 41 is tooth 42. Tooth 42 includes an outer periphery 45 into which a notch 43 is cut, exhibiting bottom wall 47 and side walls 50 and 51.

Sensor 20 includes an extension 36 of a reduced cross sectional area in comparison to pole piece 37 which is rectangular in shape and exhibits end wall 53 and side walls 54 and 55. The extension 36 is shape-coupled in a spaced-apart radial engagement with exciter ring 40 for passing through the notch 43 as exciter ring 40 rotates with spindle 10 relative to sensor 20.

Figure 3:
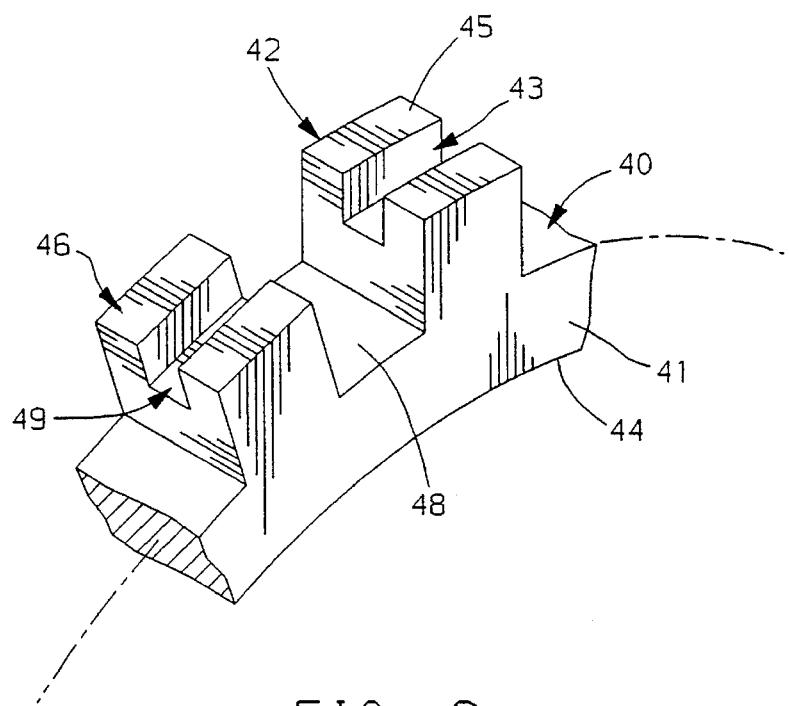
FIG. 3 is a fragmentary detail illustration of an exciter ring.
Figure 2:
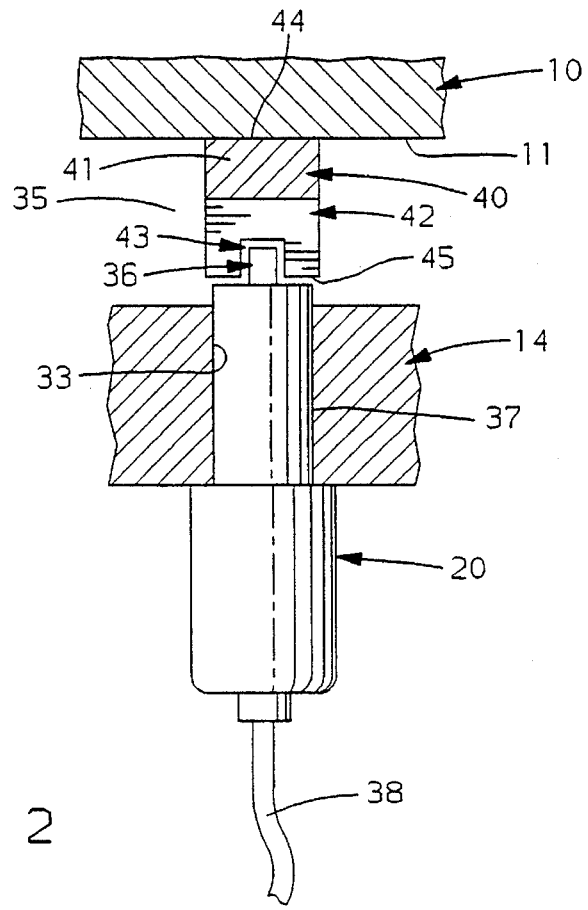
Figure 3:
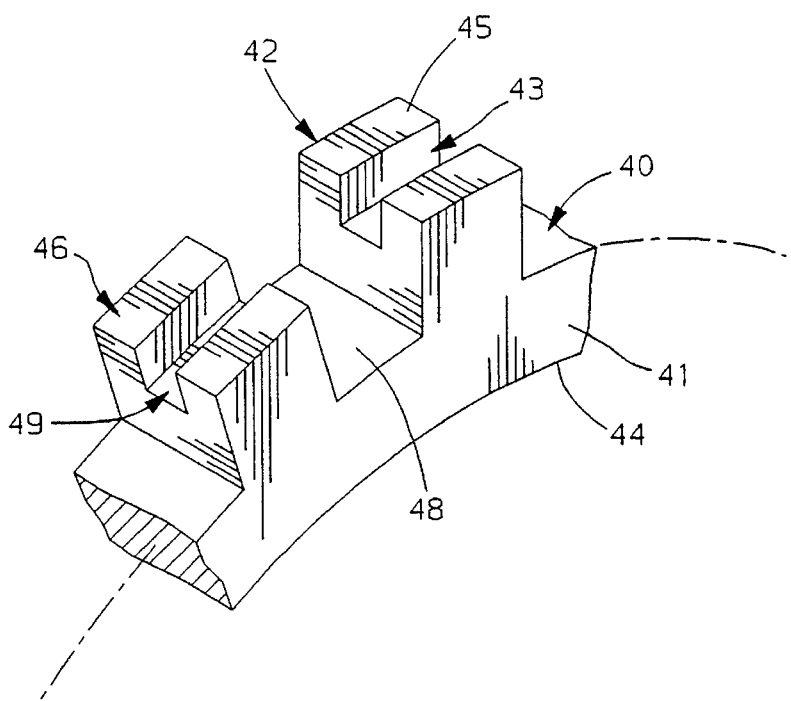

Referring additionally to FIG. 3, extension 36 passes through the series of teeth notches, such as notch 43 of tooth 42, notch 49 of tooth 46 and so on, through the outer periphery 45 of exciter ring 40, when exciter ring 40 rotates so as to create a speed indicative signal. When the exciter ring 40 rotates an incremental number of degrees, the extension 36 moves from being aligned with tooth 42 in notch 43, into the space 48 between teeth 42 and 46 and then into alignment with tooth 46 in the notch 49.

Extension 36 is shape-coupled with the plurality of notches such that a radial clearance 60 exists such as between bottom 47 of notch 43 and end wall 53 of extension 36. Axial gap 64 exists such as between side wall 50 of notch 43 and side wall 54 of extension 36. Axial gap 65 exists such as between side wall 55 of extension 36 and side wall 51 of notch 43. Axial gaps 64 and 65 together have a preferred mean clearance between walls of 0.016 inches. Magnetic flux favors the path of least reluctance, which is through the smallest of the air gaps 60, 64 or 65. For this reason, axial gaps 64 and 65 are designed to be smaller than the radial clearance 60.

With this shape-coupled configuration, wherein extension 36 is positioned within notch 43, the radial clearance 60 may vary as the tolerance stack among various part-to-part assemblies varies in the radial direction without affecting the sensing performance of the assembly because the flux will pass through the axial gaps 64, 65. Additionally, the axial gaps 64 and 65 may likewise vary, with the point of weakest signal occurring when the extension 36 is precisely centered in the notch 43. As the relative wall locations vary in the axial direction, the sensing signal becomes stronger as the majority of flux travels through the smaller gap 64 or 65, producing the performance curve 68 illustrated in FIG. 8. With part and assembly variations occurring, the smallest gap between each tooth and the extension 36, when aligned therewith, may occur through either wall 54 or 55.

Figure 5:
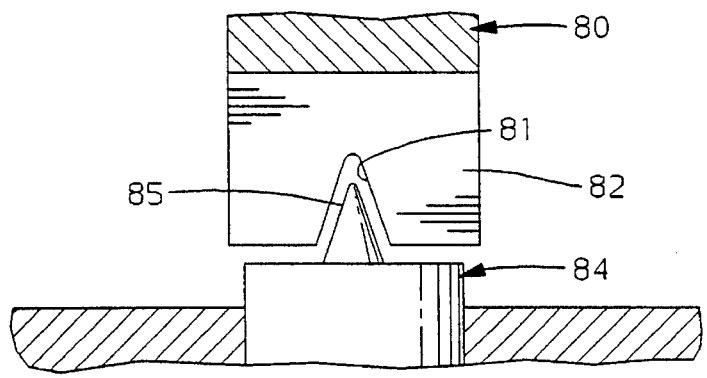
FIG. 5 is an alternate embodiment of a sensor and exciter ring combination.
Figure 6:
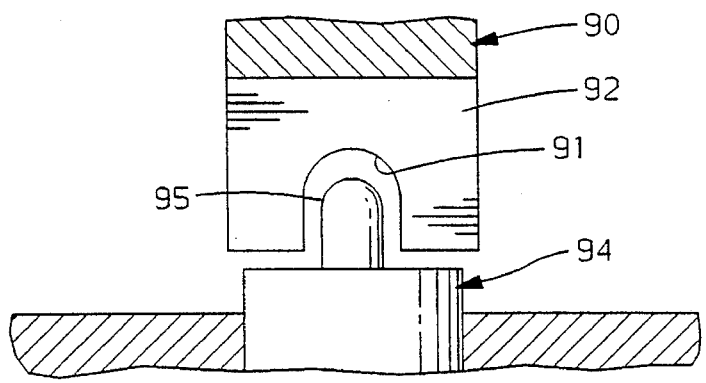
FIG. 6 is an alternate embodiment of a sensor and exciter ring combination.

Referring to FIGS. 5 and 6, alternative embodiments of shape coupled sensor and exciter ring combinations are illustrated. FIG. 5 illustrates a sensor 84 having a V-shaped extension 85 that is shape coupled with an exciter ring 80 which has a V-shaped notch 81 formed in tooth 82. FIG. 6 illustrates a sensor 94 having a rounded extension 95 that is shape coupled with an exciter ring 90 which has a rounded notch 91 formed in tooth 92. These additional embodiments illustrate the adaptability of the present invention to overcoming gap variation conditions to provide an acceptably strong signal in a variety of applications. As is apparent, this concept is extendable to other configurations.

Figure 7:
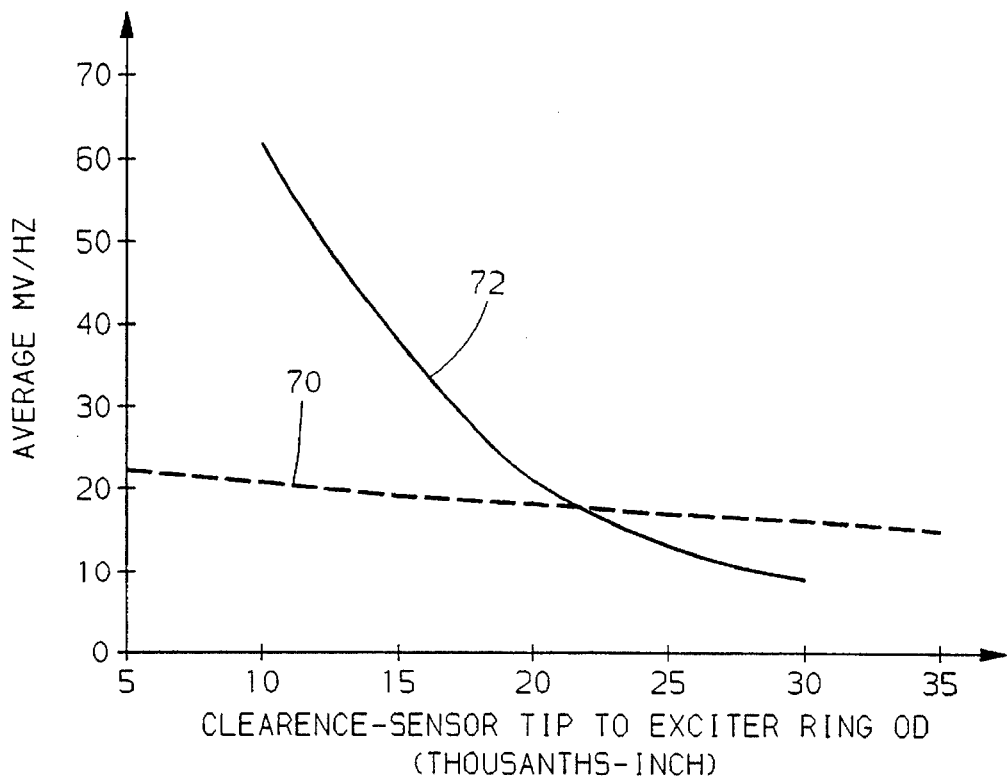
FIG. 7 is a graph of signal strength versus radial clearance between a sensor tip and an exciter ring outside diameter.
Figure 8:
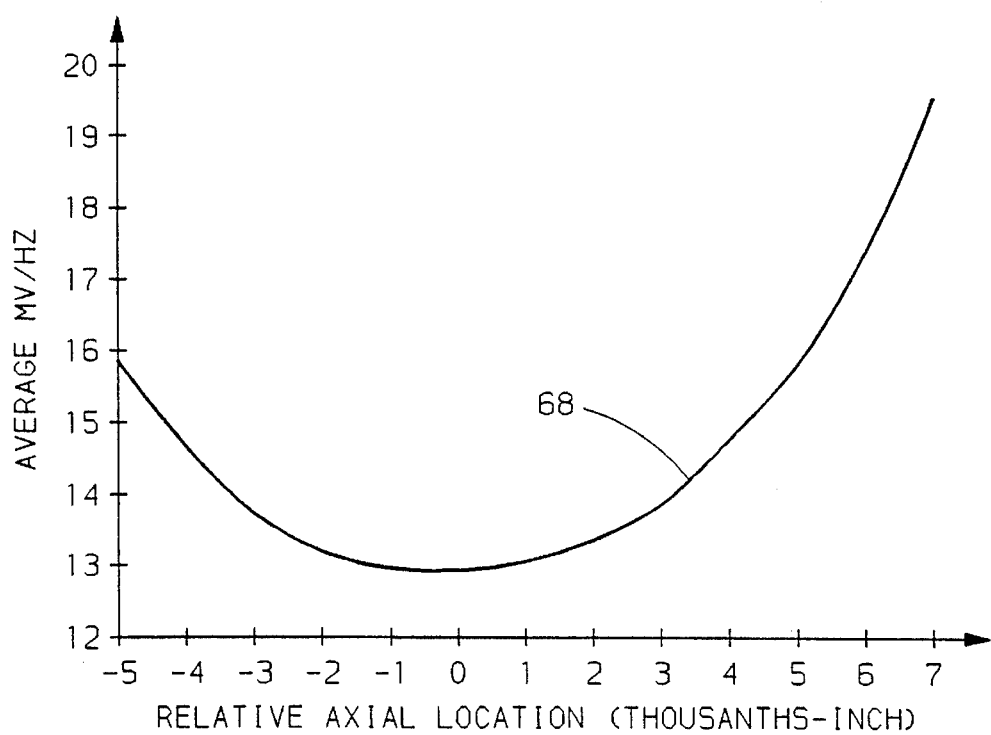
FIG. 8 is a graph of sensor strength versus relative axial location of a shape-coupled sensor extension and exciter ring.

FIG. 7 illustrates the performance of a shape-coupled sensor according to the present invention in curve 70. Curve 72 illustrates, as a comparison, the signal variation for various axial clearances of a conventional non-shape-coupled flat face sensor (not illustrated) and exciter ring (not illustrated). The curves demonstrate that, as compared to conventional sensor designs, the shape-coupled sensor and exciter ring are considerably less sensitive to radial clearances. Additionally, as illustrated in FIG. 8, as the sensor extension 36 moves either direction from a centered position in notch 43, indicated as 0 on the horizontal axis, the signal, shown by curve 68, becomes stronger in both directions.

What is claimed is:

1. A wheel speed sensing device for operating within the sealed bearing area of a wheel comprising:

an exciter ring mounted to rotate about a common axis with the wheel and having a plurality of radially extending teeth and a space between each adjacent pair of teeth, each tooth having a notch and a pair of prongs forming an annular groove around the exciter ring; and a sensor having an extension with a profile, shape coupled with the exciter ring due to a correspondence between the profile and the notches, mounted in a position fixed relative to the exciter ring such that during rotation of the exciter ring the sensor and the exciter ring radially engage each other in a spaced-apart relationship inducing a signal as the extension moves through the notches and spaces that is at a minimum when the sensor and exciter ring are in perfect axial alignment and is stronger when the sensor and exciter ring are out of perfect axial alignment.

2. A wheel speed sensing device for operating within the sealed bearing area of a wheel comprising:

an exciter ring mounted to rotate about a common axis with the wheel and having a plurality of radially extending teeth with a notch formed in each tooth and a pair of prongs straddling each notch, the notches presenting an annular groove around the exciter ring; and a variable reluctance sensor, shape coupled with the exciter ring by having an extension shaped to fit within the annular groove in a spaced-apart, radially engaged relationship so that axial gaps exist between both prongs and the extension at least one of which is less than a radial gap between the extension and the exciter ring, the sensor mounted in a position fixed relative to the exciter ring such that the extension passes within the notch of each tooth during rotation of the exciter ring so that the sensor is capable of sensing a varying change in a magnetic field due to passage of the magnetic field from the sensor extension axially through the prongs of each tooth.

3. A wheel speed sensing device for mounting within a wheel's sealed bearing area having an annular space enclosed by seals comprising:

an exciter ring mounted in the annular space and having a plurality of teeth and a plurality of spaces between each adjacent pair of teeth, the teeth each including a terminal end and extending radially outward from the exciter ring with a notch formed through the terminal end of each tooth such that the teeth each include two prongs, each prong formed on an opposite axial side of the corresponding notch, presenting a radially outwardly opening annular groove; and a removable sensor, extending into the annular space, shape coupled with the exciter ring by having an extension shaped to fit within the annular groove, wherein a radial clearance is defined between the sensor extension and the exciter ring and an axial gap is defined between the sensor extension and each prong wherein a sensing path exists between the sensor extension and both prongs of each tooth so that the sensor is capable of sensing a varying change in a magnetic field to induce a signal due to passage of the magnetic field from the extension axially through the axial gaps simultaneously to both prongs wherein the signal is weakest when the sensor is in perfect axial alignment with the exciter ring and stronger when the sensor is out of perfect axial alignment with the exciter ring such that the extension is closer to one prong than the other regardless of which prong the extension is closer to and wherein the signal is of a substantially constant strength regardless of the radial clearance amount as long as the terminal end of the extension passes within the notches.

* * * * *

UNITED STATES PATENT AND TRADEMARK OFFICE
CERTIFICATE OF CORRECTION

PATENT NO. : 5,537,032

DATED : July 16, 1996

INVENTOR(S) : George L. Hurrell, II et al

It is certified that error appears in the above-indentified patent and that said Letters Patent is hereby corrected as shown below:

In the drawings:

Sheet 1 of 6 of the drawings should be deleted and replaced with Figure 1 as shown on the attached sheet.

Signed and Sealed this

Eleventh Day of February, 1997

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,537,032
DATED : July 16, 1996
INVENTOR(S) : George L. Hurrell, II et al It is certified that error appears in the above-indentified patent and that said Letters Patent is hereby corrected as shown below:

Omitted Figure 1 is shown.

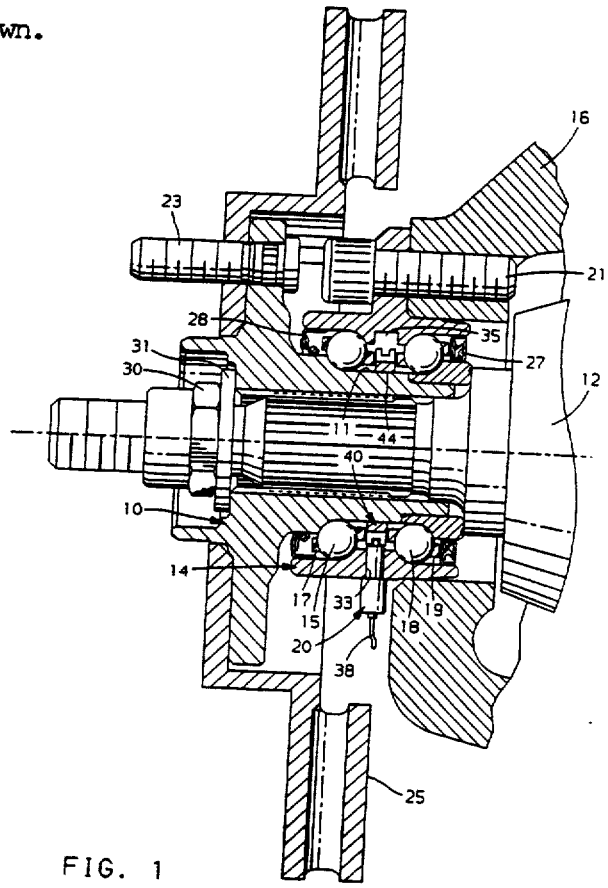

FIG. 1